United States Patent [19]

Feagin

[11] 4,415,673

[45] Nov. 15, 1983

[54] REFRACTORY MATERIAL

[75] Inventor: Roy C. Feagin, Boca Raton, Fla.

[73] Assignee: Remet Corporation, Chadwicks, N.Y.

[21] Appl. No.: 246,315

[22] Filed: Mar. 23, 1981

[51] Int. Cl.$^3$ ............................................. C04B 35/48
[52] U.S. Cl. .................................... 501/102; 501/103; 501/104; 501/105
[58] Field of Search ................ 501/102, 103, 104, 105

[56] References Cited

U.S. PATENT DOCUMENTS

| | | | |
|---|---|---|---|
| 2,984,576 | 5/1961 | Alexander et al. | 501/102 |
| 3,758,316 | 9/1973 | Sowards | 501/102 |
| 4,025,350 | 5/1977 | Walters et al. | 501/102 |

Primary Examiner—James Poer
Attorney, Agent, or Firm—Wenderoth, Lind & Ponack

[57] ABSTRACT

There is provided a refractory mix comprising an acid stabilized aqueous zirconia sol and an active refractory material in an amount effective to gel said sol.

10 Claims, No Drawings

REFRACTORY MATERIAL

FIELD OF THE INVENTION

This invention relates to the use of relatively stable acidic aqueous colloidal zirconia sol as the bonding medium for specific refractories.

BACKGROUND AND PRIOR ART

A procedure that is well-known has been used in the past for making ceramic shapes, namely mixing a binder and a gelling agent with a refractory and allowing the mix to chemically set or gel to form a bond and then firing the body. Typically many shapes have been made using sodium silicate, potassium silicate, colloidal silica, and hydrolyzed ethyl silicate as bonds. However, to obtain the greatest refractoriness of a body, a bond leaving a residue of a more refractory oxide is preferable. For example, alumina and zirconia produce high temperature bonds for refractories.

U.S. Pat. No. 4,025,350 shows the use of an aqueous solution of a zirconium salt with a gelling inducing agent and a gelling delaying agent and a refractory powder to form a refractory article. This composition requires additional gelling agents for control thereby increasing costs and control problems. Also the by-products of the gelation of the zirconium salt would need to be eliminated from the refractory during firing. There is also an added cost of the zirconium salt versus the oxide.

U.S. Pat. No. 4,201,594 describes the binding of refractory materials using zirconium salts and incorporating gelling agents and gel delaying agents. For the same reasons these compositions are less than desirable.

U.S. Pat. No. 2,984,576 describes an unfired mixture of a refractory material bonded with a zirconia or hafnia sol in which the percent of solids in the dispersed phase is at least 30%. This patent does not describe the specific refractories useful with the present stable acidic zirconia sol but only as a bond for a variety of refractories.

U.S. Pat. No. 3,758,316 describes the process for producing a refractory from a refractory powder and a binder precursor which would include colloidal zirconia, but also requires the addition of a gelling agent.

BRIEF SUMMARY OF INVENTION

The basic principle of the present invention is to make a refractory mix comprising a refractory material and a stable acidic zirconia sol having a fine particle size and acidic pH. The refractory is composed of an active portion and, if desired, a relatively inert portion.

DETAILED DESCRIPTION OF INVENTION

One would expect that highly refractory materials would be relatively inert to the zirconia sol. However, it has been found that a number of refractories are not totally inert to the sol and actually react with the sol to cause gelation of the sol. Very rapid gels or slow gels can be produced depending upon the particular type of active refractory, its particle size distribution, and its percentage in the refractory mix. Some examples of active refractories which will cause gelation with the zirconia sol are alkali and alkaline earth metal aluminates, silicates, zirconates, stannates, titanates, zirconium silicates and oxides. Specific examples include calcined magnesium oxide, electrically fused magnesium oxide, calcium oxide, electrically fused calcium oxide, mono calcium aluminate, calcium aluminate cements, fused cordierite, high alkali glasses, magnesium aluminate, magnesium aluminum silicate, magnesium zirconate, magnesium silicate, magnesium zirconium silicate, magnesium ferrite, magnesium titanate, magnesium stannate, calcium zirconate, calcium silicate, calcium zirconium siliate, calcium titanate, calcium stannate, barium zirconate, barium aluminum silicate, barium aluminate, barium zirconium silicate, barium stannate, barium titanate, barium silicate, strontium zirconate, strontium stannate, strontium zirconium silicate, strontium silicate, strontium aluminum silicate, strontium titanate, electrically fused calcium oxide stabilized zirconia, electrically fused magnesium oxide stabilized zirconia, iron chromite, Zeolex 23, wollastonite, bentonite, strontium aluminate, forsterite, calcium aluminum silicate, fluorspar, fluorbarite, lithium zirconate, lithium aluminate, lithium silicate, lithium aluminum silicate, lithium titanate, lithium zirconium silicate, and other refractory materials which are reactive with the zirconia sol. Some relatively non-reacting refractory materials are monoclinic zirconia, hafnia, alumina, bauxite, mullite, sillimanite, zircon, ceria, thoria, silicon nitride, silica and other minerals which do not contain any large amounts in their structure of the alkaline and alkaline earth metallic oxides or impurities present that may react with the sol.

It is also possible to use this system as a bond for various fibers made from aluminosilicates, low alkali glasses, alumina, zirconia, silica, and various organic fibers such as cotton, rayon, nylon, other synthetic fibers.

The aqueous zirconia sols used in the examples given in this specification are acidic in nature ranging in pH from about 0.3 to 6.0. The particle size of the zirconia particle is generally small, on the order of 25 millimicrons and smaller. The sol is stabilized by acids such as nitric, hydrochloric, acidic, etc. The gelling action of the sol with the "active" refractory is believed to be due to a reaction of the acid with the "active" refractory, producting a "salt", which reaction raises the pH thereby lowering the sol stability. Also, the salt formed possibly catalyzes the gelling of the sol. This gelling action bonds the refractory into a strong body.

Several factors govern the characteristics of the refractory body bonded with the zirconia sol. The type of acid in the sol, the particle size and age of the sol, the percentage of zirconia in the sol, the percentage and type of "active" refractory in the mix, its particle size distribution, temperature, and mixing conditions.

The listing of potential "active" refractories shows the presence in many cases of an alkaline or alkaline earth type oxide present in the structure of the refractory or that the "active" refractory is subject to reaction with an acid. The presence of such "active" refractories, serving to react with the sol not only causes gelation but also might serve as sintering aids for certain refractory systems. The comparative scratch hardness of bonded refractory shapes after firing serves as a measure of sintering action by the "active" refractory.

One procedure for utilizing this invention is to produce cast refractory shapes by mixing the zirconia sol with at least one "active" refractory. The balance of the refractory may include a relatively inert refractory. In some instances, depending upon the nature of a the active refractory, the total refractory may be of the active type. In other instances, the "active" refractory may be a very minor portion of the total refractory in the mix. Particle size distribution and chemical nature of the active refractory are two of the major factors in determining the amount of "active" refractory constituent.

Various refractory shapes can be cast using this invention to produce practical products, such as metal melting crucibles, boats, tundishes, pouring ladles, pouring cups, tubes, rods, slabs, bricks, saggers, kiln furniture, kiln car tops, open hearth door facings, kiln parts, pouring nozzles, furnace liners, and others. Such mixtures can also be used to cast dental and jewelry molds for metal casting. In particular, some of these mixes are especially suitable for molds for casting superalloys, stainless steels, niobium, tantalum, titanium, and molybdenum. By selection of a high temperature inert refractory, or low-activity "active" refractory, such as zirconia, hafnia, ceria, alumina, yttria, lanthana, a foundry mold can be produced having an extremely high PCE value and having low reactivity to some of the above-mentioned reactive metals.

If desirable, pressing mixes can be made which will "set" or "gel" in predetermined times in order that a refractory shape may be made by pressing and then become set or gelled.

Thin or thick films may be made from mixes which may be cast on a belt or form and then becoming gelled or set. Coatings may be dipped or sprayed on to a form or shape, and then allowed to gel.

Mixes according to this invention may be formed into shapes by injection molding. Present ceramic injection molding techniques usually call for various temporary bonds for the refractory body to allow for ease of molding. Examples are costly waxes, resins, plastics, etc. These organic materials are burned out without leaving a high temperature bond, and shrinkage occurs during loss of organic material. The present invention provides a "green" bond and a fired bond in the refractory body. This technique can be used to mold various-intricate shapes such as spindles, nozzles, ceramic cores for metal castings, ceramic turbine blades and vanes, shell mold parts for metal casting, and various other shapes as desired.

A primary application for this invention is to make cast refractory bodies which will set or gell at controlled times. A proportion of "active" refractory may be adjusted according to the set time required for the mass. This percentage varies with the particular "active" refractory. The resulting refractory mix can be then mixed with a suitable amount of the zirconia sol to a heavy pouring consistency and poured or cast into a mold form and allowed to set. Particle size distribution of the refractory mix may be varied according to the desired results, strength, settling within the mold, and gel times. It is usually advantageous to allow adequate time for satisfactory mixing of the refractory before casting into a mold. This depends upon the size of the mold and the equipment used to handle the mix. If a small volume hand mix is used, mixing can usually be carried out in a very short period of time such as one to two minutes and then the mix can be adjusted to gel or set very rapidly. I prefer a relatively fast gel time of 5 to 30 minutes for relatively fast production of shapes. It may be desirable to remove bubbles from the mix and to incorporate suitable wetting and defoaming agents to make a relatively bubble-free or void-free mass. Time may be needed to completely wet in the mass and to deair before casting can be made. Ideally, gelation should occur as soon as practical after pouring.

To illustrate this invention, the data in Table 1 shows the percentage of active refractory that might be mixed with an inert refractory, such as tabular alumina, to produce specific set or gel times. The refractory is mixed with the zirconia sol containing 20% $ZrO_2$ and having a pH of 0.6 The alumina portion was composed of 50% 325 mesh and finer tabular alumina and 50% 60 mesh and finer tabular alumina as supplied by Alcoa. The active refractory percentage is calculated on the basis of the total amount of refractory used for the final mix.

The samples indicated in Table 1 all had good green strength and when fired separately to 1200° F., 1800° F., 2000° F., and 2500° F. had excellent fired strengths.

Another series of similar experiments to those in Table 1 were carried out according to Table 2 in which the tabular alumina refractory base was 25% 325 mesh and finer and 75% 60 mesh and finer. This Table shows the gel times for the various mixes using the active refractory. These were mixed with the same zirconia sol as was used in Table 1. After gelling these samples had excellent green strength and after firing to the same temperature conditions had excellent fired strength. In all cases, the strength at 2500° F. was greater than that fired to temperature below 2500° F.

Some unique characteristics were noted about the compositions described in Table 1. A series of test specimens approximately 1" thick, 1" wide and 2.375" long were prepared in a mold using the same compositions as prepared in Table 1. They were allowed to set after gelation for 30 minutes and then removed from the mold. After removing from the mold, the specimen was set out in the air to air dry overnight and then oven dried for 4 hours at 120° C. to remove all the water from the shape and then placed into a dessicator for cooling. It was then removed and immediately measured. It was noted that all specimens showed some shrinkage from the mold dimension on the order of about one-half to one percent. After the specimens were dried, they were then heated to a temperature of 1200° F. and maintained at that temperature for 2 hours and then allowed to cool to room temperature and remeasured. After measuring, the specimens were then reheated to 1800° F. and held for 2 hours at temperature, cooled, and then remeasured. This same heating was carried out separately at 2000° F. and 2500° F., after which time measurements were made on the specimens. It was noted that on many specimens some very small to fairly sizeable permanent expansion occurred after cooling. The data in Table 2 shows the permanent expansion obtained on a number of the specimens cast. The negative value indicates shrinkage. The remainder of the figures indicate permanent expansion.

It can be observed from this Table that some substantial expansions occur on certain specimens. These expansions are not necessarily related to the proportion of active refractory but are definitely attributed to the presence of the active refractory. Each composition probably acts in a different manner and produces different reaction products which govern the amount of expansion obtainable. This may be a means for minimizing shrinkage during firing of refractory bodies utilizing this zirconia sol bonded system. Normally when considerable sintering occurs on firing a refractory to a high temperature, considerable shrinkage occurs with the sintering. It should be noted that several compositions in the tabulation show relatively low shrinkage even when fired at 2500° F. Table 3 shows a similar series of measurements made on specimens using the tabular alumina refractory containing 25% 325 mesh and finer and 75% 60 mesh and finer particle sizes with the corresponding "active" refractory.

The following are examples of other refractory mixes used with the acid stabilized zirconia sol and illustrating the use of "active" refractories.

EXAMPLE I

Composition:
Electrically fused calcium oxide stabilized zirconium oxide-325 mesh—30 grams
Fused Magnesium Oxide-325 mesh—1 gram
Tabular alumina 60 mesh and finer—150 grams
Tabular alumina-28+48 mesh—120 grams This refractory composition was mixed with 35 ml acid stabilized zirconia sol containing 20% $ZrO_2$. It was then poured into a rubber mold. The gel time was determined to be approximately 5 minutes. After 30 minutes, the sample was removed from the mold and by means of a diamond saw was cut into test specimens for modulus of rupture measurements. Unfired strength of this mix was approximately 57 psi. Samples were fired to 2500° F., held for two hours and cooled to room temperature, and modulus of rupture was determined as 575 psi. A similar firing to 2700° F. for two hours and then cooling showed a modulus of rupture of 910 psi. A firing to 2900° F. for two hours and cooled showed a modulus of rupture of 1888 psi.

EXAMPLE II

Composition:
Tabular alumina-325 mesh—240 grams
Electrically fused magnesium oxide—2 grams This was mixed with 45 ml of the same zirconia sol as in Example I. The gel time on this mix was approximately 4½ minutes. The green modulus of rupture was not determined but specimens fired to 2000° F. for two hours and cooled showed a modulus of rupture of 234 psi. Firing to 2500° F. for two hours and cooled showed the modulus of rupture to be 1164 psi. Firing to 2700° F. for two hours and cooling showed a modulus of rupture of 2995 psi. A specimen fired to 2900° F. for two hours showed a modulus of rupture of 5674 psi.

EXAMPLE III

Composition:
EF zirconium oxide, calcium stabilized,-325 mesh—170 grams
−50+100 mesh-325 mesh—160 grams
−12+35 mesh-325 mesh—80 grams This refractory composition was mixed with 30 ml of the zirconia sol used in Example I. The gel time was 8 minutes. The modulus of rupture measurements after firing specimens to the particular temperatures for two hours and testing after cooling are as follows:

|  | Modulus of Rupture pounds per sq. inch |
|---|---|
| Unfired | 278 |
| 2000° F. | 479 |
| 2500° F. | 1888 |
| 2700° F. | 2019 |
| 2900° F. | 2623 |

Test specimens from Examples I, II, and III were also measured before firing and after each firing and showed the following percentage permanent expansion (+) or shrinkage (−):

| Firing Temperature °F. | Examples | | |
|---|---|---|---|
|  | I | II | III |
| 2000 | +0.08 | −0.09 | −0.11 |
| 2500 | +0.29 | −0.46 | −0.51 |
| 2700 | +0.40 | −1.60 | −0.50 |

The development of some permanent expansion could be helpful in eliminating or minimizing settling and drying shrinkage on some compositions, thereby increasing dimensional accuracy in making shapes.

The following is an example of typical shell mold system possible by the use of this invention:
Composition:
Electrically fused calcium oxide stabilized zirconium oxide—2000 grams
Zirconia sol containing 20% $ZrO_2$—500 grams
Concentrated hydrochloric acid—17 ml.
Wetting agent-Sterox NJ—15 drops This slurry was prepared to a viscosity of 34 seconds as measured by the Zahn #4 cup. Sheets of wax, approximately ⅛" thick and 2½" wide by 5½" long were dipped into this slurry and immediately stuccoed while wet with a −50+100 mesh zirconia of the same composition as used in the slurry. After dipping several specimens, the slurry was diluted with the zirconia sol to a viscosity of 15 seconds and a further dip was applied after the first dip had dried overnight. While the second coating was still wet, it was stuccoed with a relatively coarse zirconia granule of a −12+35 mesh of the same composition as the material in the slurry. This was repeated for additional coatings and a final seal coat was applied, making a total of 6 stucco layers and 7 slurry layers. Two dips were applied per day through the final dip. The dipped specimens were then allowed to dry for 2 days and the wax was melted out. The specimens were then cut into strips 1" wide, dried, and then tested for unfired strength. Six specimens were tested giving an average modulus of rupture value of 500 psi. Additional specimens were fired for 2 hours to various temperatures beginning at 2000° F. and cooled back to room temperature and tested. The MOR after firing to 2000° F. was 220 psi. The MOR after firing to 2200° F. and cooling to room temperature was 300 psi. The MOR increased to 1200 psi after firing to 2500° F. This indicated a substantial strength was obtainable on a shell mold composition utilizing this invention.

TABLE 1

| Sample | Type of Active Refractory | Wt. % Active Refractory | Gel Time |
|---|---|---|---|
| 1 | Calcium Aluminate Cement | 5.0 | Immed. |
| 2 | Calcium Aluminate Cement | 1.0 | 8 min. |
| 3 | Calcium Aluminate Cement | 2.0 | 4 min. |
| 4 | Calcium Aluminate Cement | 0.5 | 45 min. |
| 5 | Magnesium Zirconate | 1.0 | 6 min. |
| 6 | Magnesium Zirconate | 0.5 | 2 hr. + |
| 7 | Magnesium Zirconium Silicate | 1.0 | Overnight |
| 8 | Magnesium Zirconium Silicate | 5.0 | 55 min. |
| 9 | Magnesium Zirconium Silicate | 7.5 | 12 min. |
| 10 | Magnesium Zirconium Silicate | 10.0 | 10 min. |
| 11 | MgO T-139[1] - 325 Mesh | 1.0 | 90 sec. |
| 12 | MgO T-139 - 325 Mesh | 0.8 | 2 min. |
| 13 | MgO T-139 - 325 Mesh | 0.6 | 4 min. |
| 14 | MgO T-139 - 325 Mesh | 0.4 | 10 min. |

TABLE 1-continued

| Sample | Type of Active Refractory | Wt. % Active Refractory | Gel Time |
|---|---|---|---|
| 15 | Calcium Zirconium Silicate | 1.0 | Overnight |
| 16 | Calcium Zirconium Silicate | 5.0 | 20 min. |
| 17 | Calcium Zirconium Silicate | 3.0 | 28 min. |
| 18 | Calcium Zirconium Silicate | 7.5 | 7 min. |
| 19 | Calcium Zirconate | 1.0 | Overnight |
| 20 | Calcium Zirconate | 5.0 | 1 hr. + |
| 21 | Calcium Zirconate | 7.5 | 90 sec. |
| 22 | Calcium Zirconate | 10.0 | Immed. |
| 23 | CaO | 1.0 | Instant |
| 24 | CaO | 0.1 | 1 hr. + |
| 25 | CaO | 0.25 | 60 sec. |
| 26 | CaO | 0.5 | Instant |
| 27 | Iron Chromite | 1.0 | Overnight |
| 28 | Iron Chromite | 5.0 | 30 sec. |
| 29 | Iron Chromite | 3.0 | Overnight |
| 30 | Iron Chromite | 4.0 | 2 hrs. |
| 31 | Iron Chromite | 5.0 | 9 min. |
| 32 | Iron Chromite | 6.0 | 5 min. |
| 33 | Zeolex 23[2] | 1.0 | Overnight |
| 34 | Zeolex 23 | 5.0 | Instant |
| 35 | Zeolex 23 | 2.0 | 8 min. |
| 36 | Zeolex 23 | 3.0 | Instant |
| 37 | Winco Cordierite[3] - 200 Mesh | 1.0 | Overnight |
| 38 | Winco Cordierite - 200 Mesh | 5.0 | 1 hr. + |
| 39 | Winco Cordierite - 200 Mesh | 7.0 | 12-15 min. |
| 40 | Winco Cordierite - 200 Mesh | 8.0 | 8 min. |
| 41 | Wollastonite | 1.0 | 7-11 min |

[1]Manufactured by C.E. Minerals, King of Prussia, Pa.
[2]Trademark of J. M. Huber Corp., Baltimore, Md.
[3]Manufactured by Winco Minerals, E. Aurora, N.Y.

TABLE 2

| Sample | Gel Time | Permanent Expansion in Thousandths of Inch at Firing Temperature | | | |
|---|---|---|---|---|---|
| | | 1200° F. | 1800° F. | 2000° F. | 2500° F. |
| 3 | 4 min. | .010 | .003 | .001— | .005— |
| 2 | 8 min. | .002 | .001— | .003 | .004— |
| 5 | 6 min. | .006 | .004 | .003 | .006— |
| 7 | Overnight | .004 | .003 | .004 | .009— |
| 10 | 10 min. | .008 | .001 | .001— | .037— |
| 11 | 1½ min. | .005 | .004 | .011 | .011— |
| 12 | 2 min. | .008 | .003 | .002 | .016— |
| 13 | 4 min. | .002 | .000 | .002— | .020— |
| 14 | 10 min. | .002 | .005 | .003 | .011— |
| 16 | Overnight | .016 | .015 | .016 | .013— |
| 18 | 7 min. | .006 | .009 | .005 | .026— |
| 17 | 28 min. | .005 | .006 | .004 | .022— |
| 19 | Overnight | .004 | .003— | .001— | .007— |
| 27 | Overnight | .008 | .010 | .000 | .012— |
| 30 | 2 hrs. | .002 | .005 | .009 | .002— |
| 31 | 9 min. | .003 | .001— | .008 | .010— |
| 37 | Overnight | .002 | .004 | .002— | .013— |
| 39 | 15 min. | .001 | .005 | .007 | .024— |
| 40 | 8 min. | | .004 | .004 | .021— |
| 41 | 11 min. | .005— | .005 | .004 | .025— |
| 24 | 60 min. + | | .004 | .006 | .015— |

I claim:

1. A method of making a refractory shape comprising mixing an acid stabilized, aqueous, colloidal zirconia sol with a refractory material, said refractory material comprising an active refractory material capable of gelling said sol and being present in an amount sufficient to gel said sol after a suitable non-gel working period, shaping the mix before gelation, allowing the mix to gel and drying the shaped mix.

2. The method of making a refractory shape according to claim 1, wherein the active refractory material is selected from the group consisting of alkali and alkaline earth aluminates, silicates, zirconates, stannates, titanates, zirconium silicates and oxides.

3. The method of making a refractory shape according to claim 1, wherein the active refractory is calcined magnesium oxide, electrically fused magnesium oxide, calcium oxide, electrically fused calcium oxide, mono calcium aluminate, calcium aluminate cement, fused cordierite, high alkali glass, magnesium aluminate, magnesium aluminum silicate, magnesium zirconate, magnesium silicate, magnesium zirconium silicate, magnesium ferrite, magnesium titanate, magnesium stannate, calcium zirconate, calcium silicate, calcium zirconium silicate, calcium titanate, calcium stannate, barium zirconate, barium aluminum silicate, barium aluminate, barium zirconium silicate, barium stannate, barium titanate, barium silicate, strontium zirconate, strontium stannate, strontium zirconium silicate, strontium silicate, strontium aluminum silicate, strontium titanate, electrically fused calcium oxide stabilized zirconia, electrically fused magnesium oxide stabilized zirconia, iron chromite, wollastonite, bentonite, strontium aluminate, forsterite, calcium aluminum silicate, fluorspar, fluorbarite, lithium zirconate, lithium aluminate, lithium silicate, lithium aluminum silicate, lithium titanate or lithium zirconium silicate.

4. The method of making a refractory shape according to claim 1, wherein the mixture of acid stabilized, aqueous colloidal zirconia sol and refractory material is of a pourable consistency and the shape is formed by pouring the mix into a mold, allowing the mix to harden and removing the hardened shape from the mold.

5. The method of making a refractory shape according to claim 1, which comprises making the mixture of acid stabilized, aqueous, colloidal zirconia sol and refractory material to a consistency suitable for injection molding and then placing such mixture into an injection molding means whereby said mix is then injected into a closed mold, allowing the mix to gel and removing the shape from the mold.

6. The method of making a refractory shape according to claim 1 which comprises placing the mixture of acid stabilized, aqueous, colloidal zirconia sol and refractory material into a mold form, molding the mix into a final shape, allowing the mix to gel and removing the gelled refractory shape from the mold.

7. The method of making a refractory shape according to claim 1, wherein said refractory shape is a coating.

8. The method of making a refractory shape according to claim 1, wherein said refractory shape is a shell mold.

9. The method of making a refractory shape according to claim 1, wherein time for gelation is from 5 to 30 minutes.

10. The method according to any one of claims 1 to 9, wherein said dried shaped mix is fired to harden it.

* * * * *